June 7, 1966  W. E. MEIERS ETAL  3,254,957
PROCESS FOR PRODUCING HYDROGEN AND COKE
Filed June 3, 1963
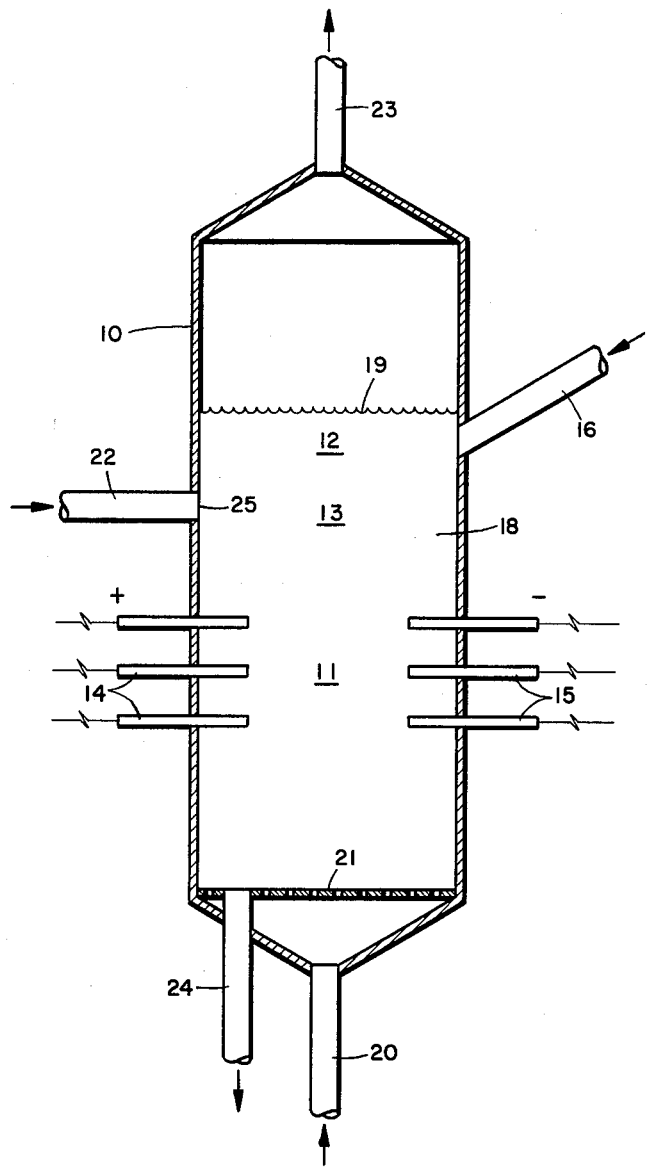
WILLIAM E. MEIERS
WAYNE T. ANDREAS   INVENTORS
BY
PATENT ATTORNEY

3,254,957
PROCESS FOR PRODUCING HYDROGEN AND COKE

William E. Meiers, Florham Park, and Wayne T. Andreas, Denville, N.J., assignors to Esso Research and Engineering Company, a corporation of Delaware
Filed June 3, 1963, Ser. No. 285,058
4 Claims. (Cl. 23—212)

The present invention is concerned with an improved reactor employing an electrically heated fluid bed for use in gasifying fluid hydrocarbons to coke and hydrogen. In particular, it deals with the elimination of the short circuiting of the electrodes and the surrounding insulating walls in gasification reactors which ultimately results in insulation failure.

Numerous methods for converting petroleum fractions into light gasiform products, e.g. hydrogen, have been advanced in the art. While, for example, the conversion of methane or refinery tail gas to hydrogen and coke is a well-known chemical reaction, the elevated temperatures required for desirable yields result in relatively high costs for supplying requisite thermal energy. Thus, numerous processes which might have been theoretically sound are impractical when analyzed from a commercial viewpoint.

Recent advances in this art have shown that in areas where the cost of electricity is relatively cheap, e.g., 6–8 mils/kwh., this reaction can be run economically by employing electrically heated, dense fluidized beds of solids maintained at the reaction temperature. The solids are heated by a controlled electrical potential or voltage applied across one or more portions of the solids bed, the resistance of the solids to electrical flow resulting in their being heated to the desired temperatures. The magnitude of the electrical potential or voltage is normally within the range of 0.1 to 1000 volts/inch, preferably 3–10 volts/inch. The electrical power is supplied through a plurality of electrodes emersed into the side of a dense phase of the fluidized coke.

The electro-fluid reactor operates in the general temperature range of 1900–2800° F., e.g., 2200–2400° F., and in the pressure range of 35 to 350 p.s.i.g., e.g., 250 p.s.i.g. Fluid hydrocarbon feed is injected into the dense bed during the operation of the reactor and is converted quantitatively to coke and hydrogen gas after a residence time of from about 0.2 to about 5.0 seconds. The solids in the fluid bed are preferably fluid coke particles from a fluid coking process or coke produced in the present process.

However, these electrically heated fluidized bed reactors, while representing a great improvement over the previous methods used in the art, still are the source of serious operational problems. The principal difficulty which has beset operation of electrically heated fluidized beds at elevated temperatures has been electrical failure. This failure has ensued as the result of apparent breakdown, within or in the vicinity of the fluidized bed, of the electrical insulating properties of the structural elements separating electrodes which are operating at different potentials. Such breakdowns are caused by short circuits and have been known to melt even ceramic structural elements used to retain the electrodes and fluidized bed.

Short circuits arise when conducting material such as coke from the fluid bed is deposited near the electrode area on or within the insulating refractory material which makes up the wall of the reactor. This allows increased current to flow through the insulating material. As this current increase, it causes the temperature of the wall to increase since it is at a high original resistance level. In turn, as the temperature rises, the electrical resistance of the insulating walls will decrease. (The electrical resistance of refractories is inversely proportional to their temperature.) Thus, more current will pass at the lower resistance, further increasing the temperature. The result is a rapidly accelerating temperature rise which will end only when the heat removed from the insulating material balances that which is being generated electrically or until the material fuses.

It has now been found that the deposition of conducting material, such as coke, in the vicinity of the electrode area arises from the fact that the fluid hydrocarbon feed point in fluidized bed reactors is located below the electrodes. When the fluid hydrocarbon stream contacts the hot fluidized solids, it is cracked, and carbonaceous material, such as coke, is formed. This newly formed material is extremely adhesive and will coat any surface it contacts. Most of this material will deposite on the surface of the fluidized solids in the reactor bed. However, a significant amount will deposit in the electrode area, thereby causing the above described electrode failure.

Removal of the fluid hydrocarbon feed point from its customary place below the electrode area in an electrically heated fluidized bed reactor to a place above the electrode area effectively reduces the amount of carbonaceous material, such as coke, which is found to deposit in the electrode vicinity. This results in a very greatly extended operating life for the reactor since the cause of the short circuiting process has been eliminated.

It is evident from the above that the greater the separation between the fluid hydrocarbon feed point and the electrode area, the greater will be the reduction in the deposition of carbonaceous materials in the electrode vicinity. However, other factors must be taken into consideration when selection of the separation distance is made. First of all a very large separation would increase the over-all size of the reactor, thereby greatly increasing the capital costs. Secondly, the function of the electrodes is to heat the fluid bed to the reaction temperature. If the point of fluid hydrocarbon feed injection is very far removed from the electrode area, the fluid bed at the point of feed injection would no longer be within the desired temperature range. Such a change would, of course, have a very undesirable effect on the over-all efficiency of the system.

It has now been found that effective separation distances between electrode areas and fluid hydrocarbon feed points located above the electrode areas can be expressed as functions of the diameter of the reactor vessel. The desired separation distance is at least 0.5 diameter, e.g. 0.5–1.5 diameters. In a preferred embodiment the hydrocarbon feed point is located 1 reactor vessel diameter above the electrode area.

The various aspects of the present invention will be made more clearly apparent by reference to the accompanying drawing.

The drawing represents a diagrammatic cross-sectional view of an electro-fluid bed reactor having a fluid hydrocarbon feed point located above the electrodes. In the drawing there is shown an electro-fluid bed reactor vessel 10 for converting a fluid hydrocarbon feed such as methane or other normally gaseous hydrocarbons and vaporizable hydrocarbons such as naphtha, etc., to hydrogen and coke at high temperatures. Reactor vessel 10 has three major zones: an electrode zone 11, reaction zone 12, and a fluid hydrocarbon feed injection zone 13 located above the electrode zone but below the reaction zone. Reactor 10 is an elongated cylindrical vessel and in one specific design has a diameter of about 9 feet and an over-all length of about 65 feet. Zones 11, 12 and 13 are 33, 24 and 8 feet long, respectively. The diameter of various embodiments of commercial size reactors may vary between about 1 and 50 feet and the length between about 6 and 150 feet. The zones 11, 12 and 13 are varied in length proportionately to the length of vessel 10.

In the specific example described, electrode pairs are spaced every 4 to 8 feet along the electrode zone. While three electrode pairs are shown in horizontally spaced relationship, the electrode may be longitudinally positioned with respect to reactor vessel 10. More or less than three pairs of electrodes may be used. An electric potential is impressed across the electrode pairs. For convenience, the positive and negative electrodes are designated 14 and 15, respectively. The potential or impressed voltage may arise from an A.C. or D.C. source, a transformer or the like being used to step up or step down the source voltage, if necessary.

Solids, generally in the form of inert petroleum coke, such as fluid coke, or coal particles, are introduced into the upper portion of reactor 10 through line 16 and are passed into the dense fluidized bed 18 therein. The coke or other solids are maintained in the form of a dense, turbulent, fluidized bed 18 having a level indicated at 19. The solid particles in the bed 18 generally range from about 10 to 1000 microns in size, with the bulk of the solids being approximately 40 to 500 microns in diameter. The density of the fluidized bed 18 is between about 25 and 60 lbs./ft.$^3$. Inert fluidizing gas, such as hydrogen or other inert gas stream is introduced by line 20 into the lower portion of electrode zone 11 to maintain the solid particles in a dense fluidized condition. The superficial velocity of the fluidizing gas in zone 11 to maintain the solid particles in a dense fluidized condition is between about 0.8 and 1.5 ft./sec. The gas may be introduced at high velocities so as to grind the solids, i.e., coke, and thus preserve a particle size distribution suitable for fluidizing. Solids size control may alternately be maintained in numerous other ways, e.g., external attrition, well known to those skilled in the art.

Grid 21 supports the solids mass in vessel 12 as well as distributing the fluidizing gas evenly over the entire bottom area of electrode zone 11. A potential is applied between electrode pairs 14 and 15 so as to cause heating of solids passing between them. This heating is due to the resistance of coke to the flow of electricity (coke having a resistance to the flow of electricity of about 0.01 to 10.0 ohm/in.$^3$, e.g., 0.03 ohm/in.$^3$) and is accomplished without the causing of electrical spark discharges through the fluid bed in the reaction vessel. When using carbonaceous matter, such as fluid coke, as the contact solids in fluid bed 18, a voltage of about 3 to 80 volts/inch is preferably employed to raise the temperature of the solids to about 1900 to 2800° F., e.g. 2200–2400° F. The electrical potential utilized will vary with the conductivity of the solid, the cracking desired per unit volume, the reaction temperature, etc. Broadly, it will range from about 0.1 to no more than 1000 volts/inch.

A fluid hydrocarbon feed stream, preferably gasiform in nature, e.g. methane or refinery tail gas, is injected into zone 13 through line 22. The feed injection point 25 should be located above the electrode zone 11. It is desirable that this feed injection point be separated from the uppermost electrode by a distance of at least 4.5 feet when the diameter of the reactor vessel is 9 feet. In the specific embodiment shown, the separation is equal to the diameter of the vessel e.g. 9 feet. Of course, for vessels having different diameters, the desired separation distance range will vary proportionately.

The hydrocarbon feed-solids mixture in feed injection zone 13 has a temperature in the range of about 1900°–2800° F., e.g., 2200–2400° F. At these temperatures, the fluid hydrocarbon feed is thermally converted almost quantitatively to coke and hydrogen. The gaseous converted products including hydrogen are passed overhead through line 23. The fluid coke is withdrawn from the bottom portion of vessel 10 through line 24. Residence time necessary for the completion of this reaction is in the range of 0.2 to 5.0 seconds. Therefore, the cracking of the hydrocarbon feed with its concomitant deposition of coke will be completed well before the normal circulation within the fluid bed would bring the feed-solids mixture in the vicinity of the electrodes.

Utilizing fluid hydrocarbon feed injection at points above the electrodes therefore results in the elemination of the major cause of electrical failure in electro-fluidized bed reactors. This is shown by a test run wherein the operational life of a laboratory reactor equipped with a fluid hydrocarbon feed point located below the electrode area is compared with a reactor run under the same conditions but equipped with a fluid hydrocarbon feed point located above the electrode area. The results are summarized in Table I.

TABLE I

|  | Feed Point Below Electrode | Feed Point 1 Diameter Above Electrode |
| --- | --- | --- |
| Diameter of Reactor | 3.5" | 3.5". |
| Hydrocarbon Feed | $CH_4$ | $CH_4$. |
| Fluidizing Gas | $N_2$ | $N_2$. |
| Feed Injection Pressure | Atmospheric+ | Atmospheric+. |
| Reaction Pressure | Atmospheric | Atmospheric. |
| Reaction Temperature | 2,350° F | 2,380° F. |
| Quantity of Feed/Hr | 4.7 s.c.f.h | 4.7 s.c.f.h. |
| Quantity of Hydrogen Produced/Hr. | 8.09 s.c.f.h | 8.09 s.c.f.h. |
| Quantity of Coke Produced/Hr | 0.128 lb./hr | 0.128 lb./hr. |
| Reactor Lifetime Before Electrical Failure. | 6 hours | Did not fail during 257 Hours of operation. |

Thus, elimination of the deposition of coke on or about the electrodes resulted in an extremely large increase in the reactor lifetime. Having described the invention in particularity, that which is claimed is set forth in the appended claims.

What is claimed is:

1. In a process for cracking a hydrocarbon feed to coke and light gasiform products consisting essentially of hydrogen, wherein coke particles are contained within a reaction zone, fluidized by upwardly flowing inert gases by injection thereof into the bottom of the zone to form a dense turbulent bed of substantial height and diameter having an upper surface level, an electrode zone formed by application of an electrical voltage ranging from about 0.1 to about 1000 volts/inch across a portion of said fluidized bed intermediate the bottom and upper surface level to provide temperatures ranging from about 1900° F. to about 2800° F., the improvement comprising introducing said hydrocarbon feed exclusively into the upper portion of the bed at a location spaced apart from and above the electrode zone and at a distance therefrom ranging at least from about 0.5 to about 1.5 times the bed diameter.

2. The process of claim 1 wherein the applied electrical voltage ranges from about 3 to about 10 volts/inch.

3. The process of claim 1 wherein the residence time of the hydrocarbon feed to the reaction ranges from about 0.2 to about 5.0 seconds and wherein said hydrocarbon feed is converted quantitatively to coke and hydrogen gas.

4. The process of claim 1 wherein the fluidizing gas is fed into the bed at a superficial velocity of from about 0.8 to about 1.5 ft./sec., the coke solids particles range in size from about 10 to about 1000 microns and provide a density ranging from about 25 to about 60 lbs./ft.$^3$.

References Cited by the Examiner

UNITED STATES PATENTS 2,799,640  7/1951  Pevere _____ 196—121

BENJAMIN HENKIN, *Primary Examiner.*

ALPHONSO D. SULLIVAN, *Examiner.*

A. RIMENS, B. H. LEVONSON, *Assistant Examiners.*